United States Patent [19]
Larkin

[11] Patent Number: 5,830,097
[45] Date of Patent: Nov. 3, 1998

[54] MULTI-RANGE WITH INFINITELY VARIABLE RATIO IN EACH RANGE, HYDROMECHANICAL TRANSMISSION FOR OFF-ROAD VEHICLES

[75] Inventor: Robert Francis Larkin, Pittsfield, Mass.

[73] Assignee: General Dynamics Defense Systems, Inc., Falls Church, Va.

[21] Appl. No.: 857,501

[22] Filed: May 16, 1997

Related U.S. Application Data

[60] Provisional application No. 60/018,331, May 24, 1996.

[51] Int. Cl.⁶ ................................................ F16H 47/04
[52] U.S. Cl. .............................................. 475/72; 475/81
[58] Field of Search ................................. 475/72, 73, 78, 475/80, 81

[56] References Cited

U.S. PATENT DOCUMENTS

| | | | |
|---|---|---|---|
| 3,596,535 | 8/1971 | Pollak | 475/72 X |
| 4,754,664 | 7/1988 | Dick . | |
| 5,080,637 | 1/1992 | Tenberge et al. | 475/72 X |
| 5,466,197 | 11/1995 | Mitsuya et al. | 475/72 |
| 5,616,091 | 4/1997 | Warren | 475/72 |
| 5,730,678 | 3/1998 | Larkin | 475/81 |

FOREIGN PATENT DOCUMENTS

| | | | |
|---|---|---|---|
| 0 003 397 A1 | 8/1979 | European Pat. Off. . | |
| 1426862 | 9/1988 | U.S.S.R. | 475/72 |
| 87/01781 | 3/1987 | WIPO | 475/72 |
| 87/01782 | 3/1987 | WIPO | 475/72 |
| 91/19118 | 12/1991 | WIPO | 475/72 |

Primary Examiner—Khoi Q. Ta
Attorney, Agent, or Firm—Finnegan, Henderson, Farabow, Garrett & Dunner

[57] ABSTRACT

A hydromechanical transmission receives split power inputs from a vehicle engine, one split input driving a hydrostatic power unit and the other split input driving a mechanical power input. The infinitely variable hydrostatic power output is combined in the mechanical power unit with multiple ratios of its split input power to achieve multiple ratios of hydromechanical output power for smoothly propelling a vehicle from rest through multiple transmission ranges to maximum speed, with synchronous shifting between ranges. The hydromechanical transmission is particularly applicable to off-road vehicles, such as agricultural tractors.

13 Claims, 6 Drawing Sheets

| RANGE | B1 | B2 | B3 | B4 | CL1 | CL2 | HSU STROKE | SPEED RATIO Vin : Vout |
|---|---|---|---|---|---|---|---|---|
| FIRST | X | | | | | | 0 → 52% | 1:0 → 1:0.12 |
| SECOND | | X | | | | | 7.4% → 52% | 1:0.12 → 1:0.23 |
| THIRD | | | X | | | | 7.4% → 101.4% | 1:0.23 → 1:0.45 |
| FOURTH | | | | | X | | 11% → 101.4% | 1:0.45 → 1:0.65 |
| FIFTH | | | | | | X | 11% → 100% | 1:0.65 → 1:0.87 |
| REVERSE | | | | X | | | 0 → 100% | 0 → 1:0.39 |

MULTI-RANGE WITH INFINITELY VARIABLE RATIO IN EACH RANGE, HYDROMECHANICAL TRANSMISSION FOR OFF-ROAD VEHICLES

This application claims section 119 benefit of U.S. Provisional Application No. 60/018331 filed May 24, 1996.

REFERENCE TO RELATED APPLICATION

This application is related to applicant's copending application entitled "Multi-Range Hydromechanical Transmission for Motor Vehicles," Ser. No. 08/608,389, filed Feb. 28, 1996. The disclosure of this related application is incorporated herein by reference.

FIELD OF THE INVENTION

The present invention relates to hydromechanical transmissions and particularly to multi-range hydromechanical transmissions applicable for inclusion in drivetrains for off-road vehicles.

BACKGROUND OF THE INVENTION

Innumerable designs of transmissions for cars and light commercial vehicles have been proposed over the years that utilize hydraulic transmissions for multiplying engine torque to accelerate a vehicle from rest and then restore or preferably increase output speed potential. However, such design efforts have typically resulted in hydraulic transmissions that, although of acceptable torque capacity, are undesirably large and heavy. Moreover, such transmissions have exhibited less than optimum efficiency, and thus fuel economy and/or performance suffer.

As an alternative to the purely hydraulic transmissions, referred to above, hydromechanical transmissions have been utilized in drivetrains for large off-road construction and military vehicles. Such transmissions are typically of a split power input type, wherein a hydrostatic power unit and a mechanical power unit are driven in parallel by the vehicle engine. The hydrostatic power unit converts its split mechanical input power from the engine into hydrostatic output power that can be infinitely varied in speed and torque over a particular hydrostatic stroke range. This hydrostatic output power is combined in the mechanical power unit with its split mechanical input power from the engine to produce hydromechanical output power in multiple power ranges. The speed and torque in each of the power ranges initially set by gear ratios of the mechanical power unit can be infinitely varied by varying the stroke of the hydrostatic power unit.

A properly designed hydromechanical transmission can advantageously provide synchronous range shifting that affords smooth and uninterrupted power flow from engine to driving wheel(s), as the vehicle is accelerated from rest to maximum speed. An additional benefit is that the engine may be operated at or near its peak efficiency output speed, regardless of transmission output speed. However, to achieve the performance required of off-road vehicles in terms of acceleration, speed and fuel economy, the mechanical power unit has traditionally required far too many geartrains, such as spur and pinion gear sets and planetary gear sets. For example, agricultural tractor transmissions require a very wide ratio range and the capability to precisely match engine power to ground speed and power take-off (PTO) driven implements. Thus, typical tractor transmissions have as many as twenty-four speed ranges. Such mechanical transmissions suffer the same drawbacks as their counterpart hydraulic transmissions in terms of size, weight, efficiency, cost, etc.

SUMMARY OF THE INVENTION

It is accordingly an objective of the present invention to substantially obviate one or more of the limitations and disadvantages of prior art transmissions for off-road vehicles, such as agricultural tractors.

To this end and in accordance with the purpose of present invention, as embodied and broadly described, the present invention provides a multi-range hydromechanical transmission comprising, in combination, a transmission controller for receiving operator speed commands; a hydrostatic power unit having a first mechanical input for driving connection to a prime mover and a unidirectional hydrostatic output, the hydrostatic power unit being operatively connected for control by the transmission controller to provide an infinitely variable transmission ratio between a speed of the first mechanical input and a speed of the hydrostatic output over a continuous range of at least 1:0 to 1:1.

The transmission further comprises a mechanical power unit having a second mechanical input for driving connection to the prime mover and a transmission output for connection to a driving wheel of a vehicle. The mechanical power unit includes a first planetary gear set having a first gear element connected to the second mechanical input at a first gear ratio, and second and third gear elements; a second planetary gear set having a fourth gear element connected to the second mechanical input at a second gear ratio, and fifth and sixth gear elements; and a combining gear mechanism including third and fourth interconnected planetary gear sets having a seventh gear element connected to the third gear element of the first planetary gear set, an eighth gear element connected to the hydrostatic output, a ninth gear element connected to the sixth gear element of the second planetary gear set, and a tenth gear element connected as the transmission output. The mechanical power unit further includes range shifting means actuated by the transmission controller in response to operator input speed commands for braking and/or clutching selected gear elements of the first through fourth planetary gear sets to produce an infinitely variable output speed at the transmission output within each of at least one reverse range and at least first, second, and third forward ranges.

Additional objectives and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate a presently preferred embodiment of the invention and together with the description, serve to explain the principles of the invention.

Like reference numerals refer to like parts throughout the several view of the drawings.

DETAILED DESCRIPTION OF THE PREFERRED EMBODIMENTS

A multi-range hydromechanical transmission in accordance with the present invention includes a split input for dividing the power output of a prime mover between a hydrostatic power unit and a mechanical power unit. The hydrostatic power unit is operable to convert split input power to hydrostatic output power over a continuously variable speed ratio ranging from 1:0 to at least 1:1. The mechanical power unit combines split input power with the hydrostatic output power from the hydrostatic power unit to provide hydromechanical output power for application to a load, such as one or more driving wheels of a vehicle.

Further, the mechanical power unit of the invention is capable of shifting the split input power between multiple power flow paths that include unique combinations of mechanical gear sets for a corresponding multiple of mechanical power outputs at different ratios of torque and speed. The mechanical power unit then individually combines each of the mechanical outputs with the hydrostatic power unit output to produce hydromechanical output power at multiple ranges of speed and torque. Within each range, an infinitely variable power ratio is achieved by varying the hydrostatic power unit ratio between 1:0 and at least 1:1.

Figure 1A:
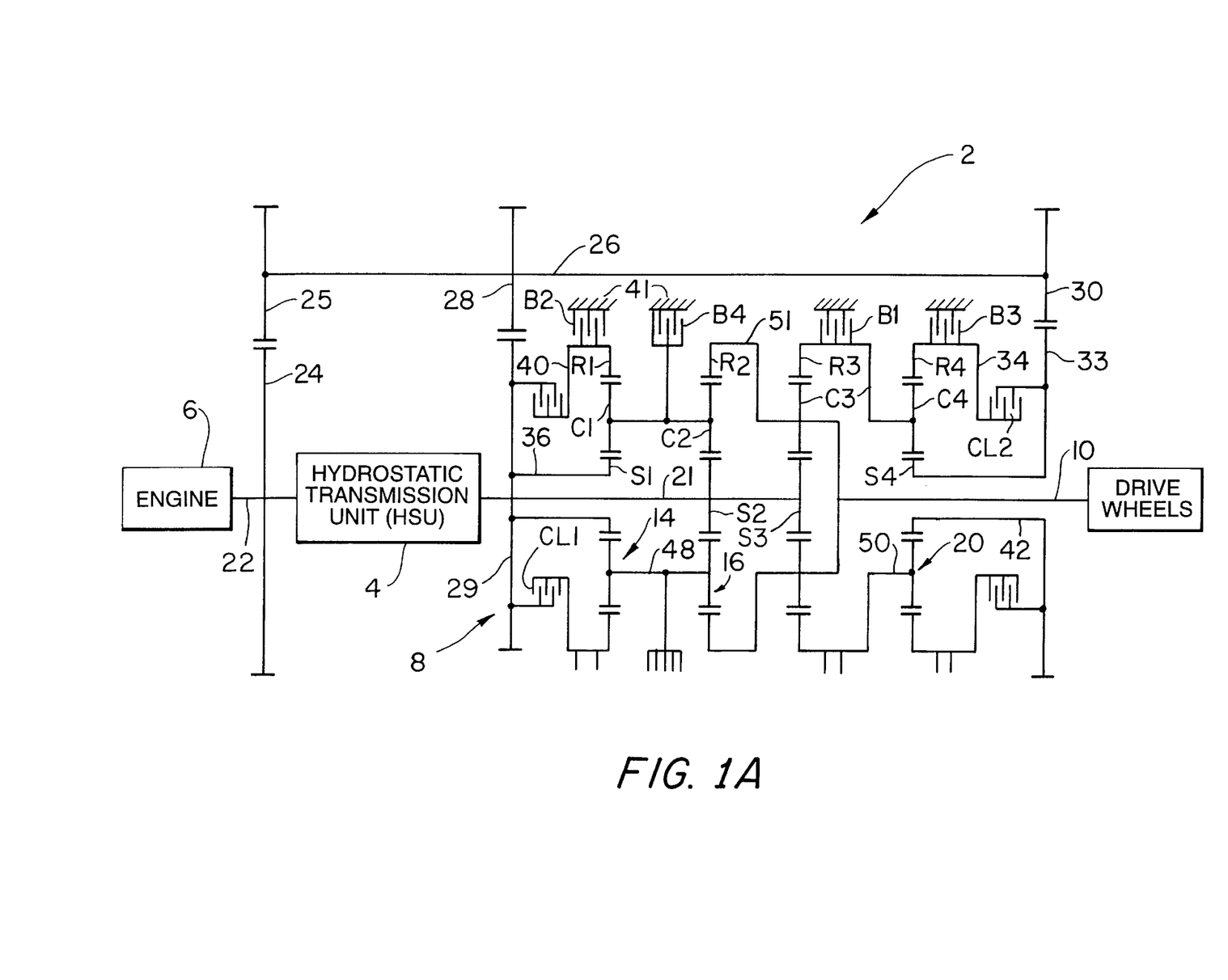
FIG. 1A is a schematic diagram of a hydromechanical transmission structured in accordance with one embodiment of the present invention.

Turning to the schematic diagram of FIG. 1A, illustrating a presently preferred embodiment of the present invention, a multi-range hydromechanical transmission, generally indicated at 2, includes an input shaft 22 for receiving input power from a prime mover, such as a internal combustion engine 6. This input power is split between a hydrostatic power unit (HSU) 4 and a countershaft 26, included in a mechanical power unit, generally indicated at 8. As illustrated by way of example in FIG. 1, hydrostatic power unit 4 receives its split input from engine 6 directly from input shaft 22, while mechanical power unit 8 receives its split input via a spur gear 24 driven by input shaft 22, which meshes with a spur gear 25 fixed on the left end of countershaft 26. Driven off this countershaft are two spur gears 28 and 30. Spur gear 28 meshes with a spur gear 29 carried by a sleeve shaft 36, which is connected to drive a sun gear S1 of an input planetary gear set 14. Spur gear 29 is also selectively coupled by a clutch CL1 to a sleeve shaft 40 connected to ring gear R1 of input planetary gear set 14. A brake B2 is provided to connect sleeve shaft 40 to the transmission housing, indicated at 41, and thus brake this sleeve shaft and ring gear R1 against rotary motion. In this case, ring gear R1 is said to be "grounded".

Still referring to FIG. 1A, countershaft spur gear 30 meshes with spur gear 33 carried on a sleeve shaft 42, which is connected to a sun gear S4 of a second input planetary gear set 20. Spur gear 33 is also selectively connected to a sleeve shaft 34 by a clutch CL2; the sleeve shaft also being connected to the ring gear R4 of second input planetary gear set 20 and selectively grounded to transmission housing 41 by brake B3.

The infinitely variable speed hydrostatic output of hydrostatic power unit 4 on output shaft 21 is applied jointly to a sun gear S2 of a planetary gear set 16 and to sun gear S3 of planetary gear set 18, which serve as a combining gear set, i.e., combining the hydrostatic inputs on their sun gears with the mechanical inputs from planetary gear sets 14 and 20 to produce a transmission output on shaft 10. Completing the description of transmission 2, planetary gear carriers Cl and C2 of planetary gear sets 14 and 16 are interconnected by a sleeve shaft 48, which is selectively braked by a brake B4 to ground carriers C1 and C2 to transmission housing 41. Ring gear R3 of planetary gear set 18, and planet gear carrier C4 of planetary gear set 20 are interconnected by a sleeve shaft 50, which is selectively braked by a brake B1 to ground these planetary gear elements to the transmission housing 41. A transmission output on shaft 10 is then taken off of the planetary gear carrier C3 of planetary gear set 18, which is connected to ring gear R2 of planetary gear set 16 by a sleeve shaft 51.

As will be seen from the description to follow, the split power input of engine 6, ratioed by spur gears 24 and 25, is tapped from the countershaft 26 at various magnitudes of speed and torque determined by the ratios of the meshing spur gear sets 28–29 and 30–33 to establish five forward ranges and one reverse range of operation for transmission 2, depending upon selective engagements of the various brakes and clutches. More specifically, in all ranges, the split mechanical input power on countershaft 26 is applied through spur gear sets 28–29 and 30–33 to sun gears S1 and S4 of planetary gear sets 14 and 20, respectively. While second through fifth ranges are hydromechanical ranges, first forward range is purely a hydrostatic range, and thus transmission output power is supplied solely by HSU 4 at infinitely variable torque and speed. Within each of the four higher forward speed ranges, the infinitely variable hydrostatic output power supplied by hydrostatic power unit 4 is combined with the mechanical input power tapped from countershaft 26 to achieve infinitely variable output power (speed and torque) in each of the second through fifth ranges. As will be seen, transmission 2 also has the capability of operating in an infinitely variable speed reverse range comparable in power to the first forward range, with input power supplied solely by HSU 4.

To facilitate an explanation of the operation of transmission 2, the following description takes advantage of the analysis technique described in the article "Lever Analogy—A New Tool In Transmission Analysis," by Benford et al., Society of Automotive Engineers, Pub. No. 810102 (1981). According to this technique, a planetary gear set, at rest, can be analogized by a vertical line (lever), with its sun gear, ring gear, and planetary gear carrier represented as points on this line; these points being relatively positioned in accordance with the numbers of sun gear and ring gear teeth, i.e., gear ratio.

Figure 1B:
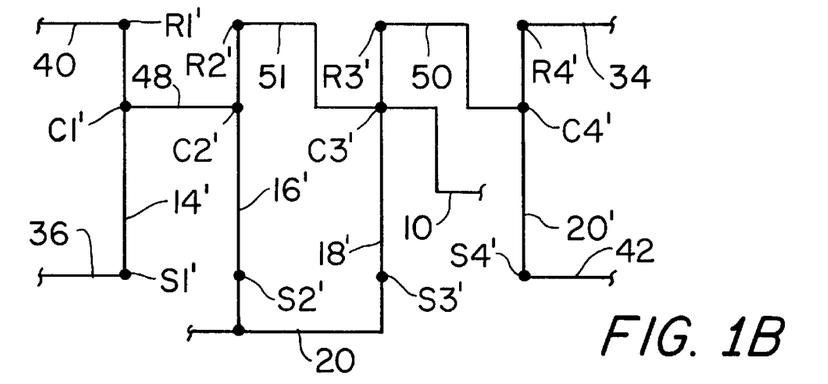
FIGS. 1B and 1C are Lever Analogy diagrams representing the four planetary gear sets in the transmission embodiment of FIG. 1A.
Figure 1C:
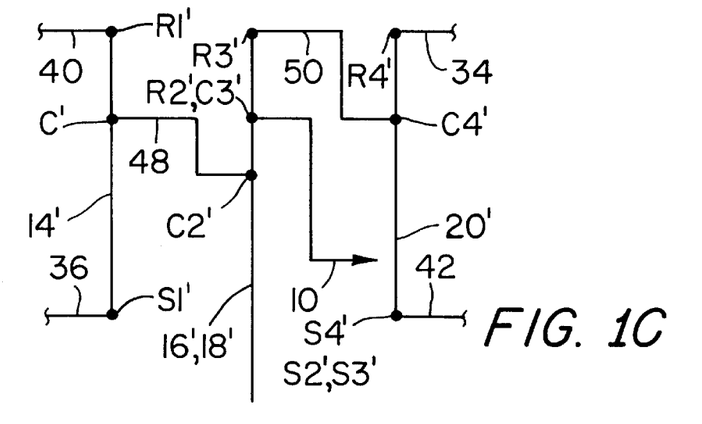

FIG. 1B is a graphical representation of the four planetary gear sets 14, 16, 18, and 20 of FIG. 1A as four vertical levers 14', 16', 18', and 20', respectively, in accordance with this Lever Analogy technique. Also represented in FIG. 1B are the interconnections between gear elements of the planetary gear sets 14, 16, 18, and 20 provided by sleeve shafts 48, 50, and 51, as well as the various countershaft power inputs on sleeve shafts 36, 34, 40, 42, the hydrostatic input on shaft 21, and the output on transmission output shaft 10. FIG. 1C illustrates that, according to this Lever Analogy, the interconnections between planetary gear sets 14, 16, 18, and 20 permit the graphical representation of these four planetary gear sets to be simplified by combining planetary gear sets 16 and 18, such that they may be represented by a single lever 16', 18'.

Figure 3:
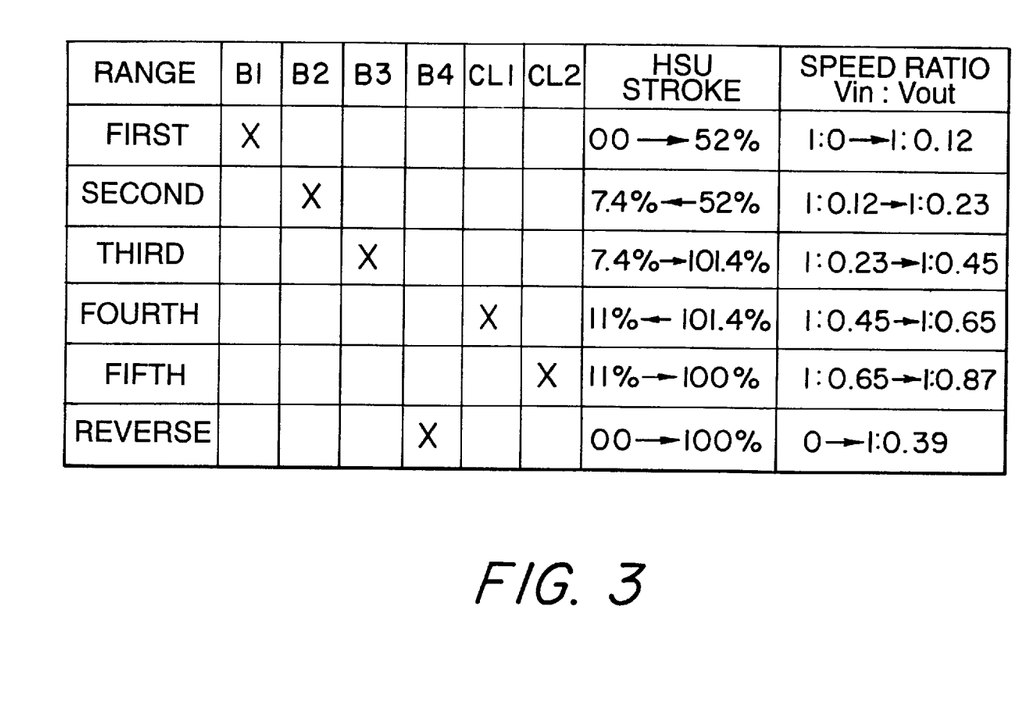
FIG. 3 is a table indicating which of the multiple brakes and clutches in the transmission embodiment of FIG. 1A are engaged in each of the transmission ranges, together with exemplary operating parameters for each transmission range.

From the table seen in FIG. 3, brake El is the only one of the various brakes and clutches that is engaged to shift transmission 2 into the first forward range. From FIG. 1A, it is seen that actuation of brake B1 grounds ring gear R3 of planetary gear set 18 and planetary carrier C4 of planetary gear set 20. The inputs to the planetary gear sets are thus the mechanical input on countershaft 26 applied to sun gear S1 at a speed determined by the ratio of spur gears 28, 29 and applied to sun gear S4 at the speed ratio of spur gears 30, 33, and the hydrostatic output from HSU 4 applied to sun gears S2 and S3 via shaft 21.

Figure 2A:
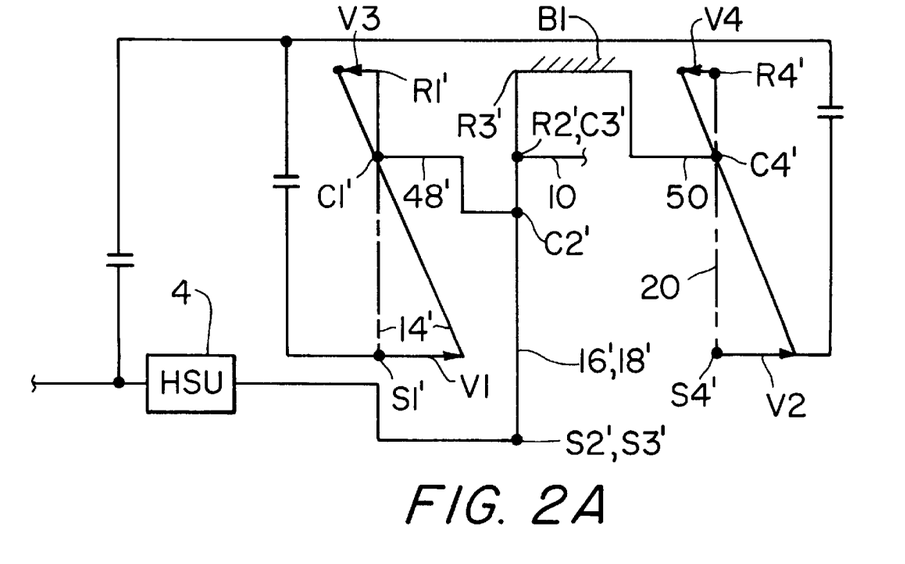
FIGS. 2A–2G are Lever Analogy diagrams providing graphic analyses of the operations of the four planetary gear sets in the transmission embodiment of FIG. 1A in each of the multiple transmission ranges.

FIG. 2A is a graphical representation according to the Lever Analogy of transmission 2 in FIG. 1 while hydrostatic power unit 4 is at zero (0%) stroke, i.e., 1:0 ratio (neutral), and thus its hydrostatic output applied to sun gears S2, S3 is zero. This effectively fixes the position of point S2', S3' representing these gear elements. Since engaged brake El fixes the position of point R3' representing ring gear R3, lever 16', 18' can be considered as fixed in a vertical orientation. Engaged brake B1 also fixes the position of point C4', on lever 20', representing carrier C4. Moreover, since planetary gear carriers C1 and C2 are tied together by sleeve shaft 48, point C1', representing carrier C1 on level 14', is also fixed in position. Consequently, levers 14' and 20' simply pivot counterclockwise about points C1' and C4' in response to the mechanical inputs on sun gears S1 and S4. Vectors V1 and V2 (pointing rightward) represent that sun gears S1 and S4 are driven in the forward direction in response to these inputs at speeds equal to engine speeds respectively ratioed by the spur gear sets 24–25, 28–29, and 30–33. Vectors V3 and V4 (pointing leftward) represent that ring gears R1 and R4 simply spin in a reverse direction at speeds relative to the sun gear S1 and sun gear S4 speeds determined by the gear ratios of planetary gear sets 14 and 20. No power is transferred from planetary gear sets 14 and 20 to the combining planetary gear sets 16 and 18, and thus no output appears on transmission output shaft 10, as is graphically illustrated in FIG. 2A. When any lever points representing planetary gear elements fall on the vertical dashed lines shown in FIG. 2A–FIG. 2G, their velocities are zero.

It will be appreciated that this transmission neutral condition (no transmission output regardless of engine input power) is achieved only because the hydrostatic power unit 4 is at 0% stroke (1:0 ratio) and thus produces no output power on shaft 21. However, with brake B1 engaged, a "true neutral" in the automotive sense is not achieved since transmission output shaft 10 is not free to rotate. Rather, the neutral condition illustrated in FIG. 2A corresponds to a conventional automotive automatic transmission with the shift selector in a drive position and the engine at idle speed with the vehicle brake applied.

To provide "true neutral" in transmission 2 of the present invention, the hydrostatic transmission unit may be depressurized, such as disclosed in applicant's copending application Ser. No. 08/543,545, such that its output shaft 21 is free to turn, or a disconnect clutch may be installed between engine 6 and transmission input shaft 22 to be disengaged along with brake B1, so as to allow the transmission output shaft to freely turn.

Figure 2B:
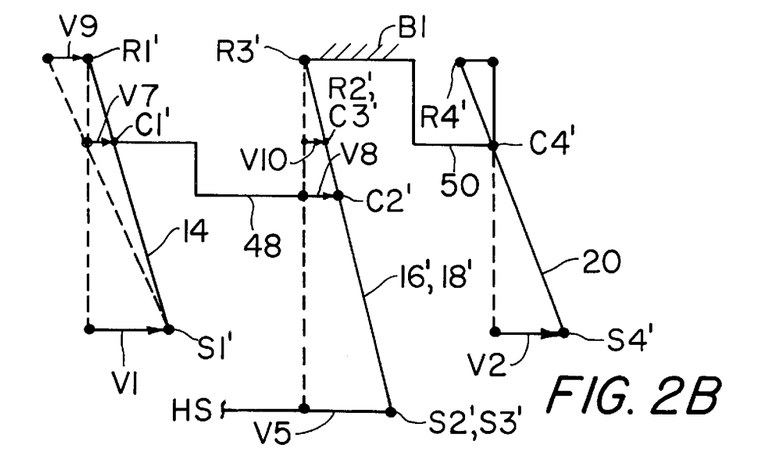

FIG. 2B is a graphical representation according to the Lever Analogy of transmission operation in the first forward speed range. Since brake B1 is engaged, the position of the ring gear representation point R3' is fixed, and thus the combined lever 16', 18' representation of planetary gear sets 16 and 18 must swing about this point in response to a hydrostatic input on shaft 21 applied to sun gears S2 and S3 by stroking HSU unit 4 upwardly from 0% stroke (from 1:0 toward 1:1). This lever swinging motion about the R3' point is from its phantom line position (corresponding to its vertical (zero velocity) solid line position in FIG. 1A) toward its solid line position in FIG. 2B. Vector V5 represents the forward speeds of sun gears S2, S3. Since planetary gear carrier C1 is tied to planetary gear carrier C2, it is rotating a forward speed (vector V7), as is carrier C2 (vector V8), and lever 14', representing planetary gear set 14, simply swings about sun gear point S1' established by the mechanical input (vector V1) on sun gear S1, allowing carrier C1 to follow the increasing forward speed of carrier C2. The reverse speed (vector V9) of ring gear R1, which is free to spin and thus exerts no reaction force, progressively decreases as lever 14' swings from its phantom line position (corresponding to its solid line position in FIG. 2A) toward its solid line position in FIG. 2B. However, in process, no mechanical input is applied through planetary gear set 14 to planetary gear set 16. Similarly, lever 20' (representing planetary gear set 20) simply swings about carrier point C4' (grounded by brake B1) in response to the mechanical input (vector V2) applied to sun gear S4. Vector V10 represents the forward speed of carrier C3 tied to output shaft 10.

It is thus seen that first forward range is a pure hydrostatic drive range and is infinitely variable in speed ratio in accordance with the stroking of hydrostatic power unit 4. FIG. 2B graphically illustrates in solid line the lever orientations and the vectors indicate directions and speeds of the elements of planetary gear sets 14, 16, 18, and 20 at a predetermined maximum stroke of the hydrostatic power unit upon achieving the desired upper end of first forward range.

Figure 2C:
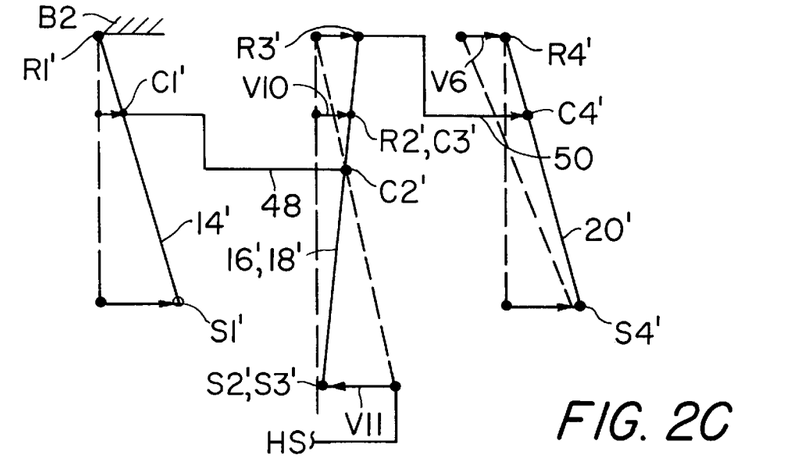

To shift from first forward range to second forward range, brake E1 is disengaged as brake B2 is engaged, as seen in FIG. 3. FIG. 2C graphically illustrates, by Lever Analogy, the actions of the planetary gear set elements in response to second range hydrostatic and mechanical input drives. It is seen that, with brake B2 engaged, ring gear R1 is grounded, thus fixing the position of R1' point on lever 14'. The orientation of lever 14' (and position of carrier point C1') is then established by the forward speed of sun gear S1 (vector V1) determined by the gear-ratioed input power applied thereto from the engine 6 via countershaft 26. Since carriers C1 and C2 are tied together, the forward speed (vector V7) of carrier C1 can establish carrier C2 as a pivot point C2' for lever 16', 18'. It will be appreciated that the positions of points C1' and C2' vary with engine speed, however, at any given engine speed, point C2' can be considered a solid pivot point.

Comparing FIGS. 2B and 2C, it is seen that the orientation of lever 14' in FIG. 2C is the same as its orientation at the top end of first forward range, illustrated in solid line in FIG. 2B. Levers 16',18', and 20' are illustrated in phantom lines in FIG. 2C in the same orientations (illustrated in solid lines in FIG. 2B) they achieved at the top end of first forward range. Now, as the hydrostatic power unit 4 is downstroked in speed (S2',S3' vector V11) from its maximum stroke at the first range-second range shift point toward a minimum stroke at the top end of second range, lever 16',18' is pivoted about carrier point C2' in the clockwise direction toward its solid line lever position at the top end of second range (FIG. 2C). As a result, the forward speed (vector V10) of point R2',C3' is seen to increase in infinitely variable fashion, as represented by vector V10. Lever 20' simply swings clockwise about pivot point S4' established by the mechanical input on sun gear S4, i.e., it follows the clockwise motion of lever 16',18' due to the interconnection of ring gear point R3' and carrier point C4'.

Figure 2D:
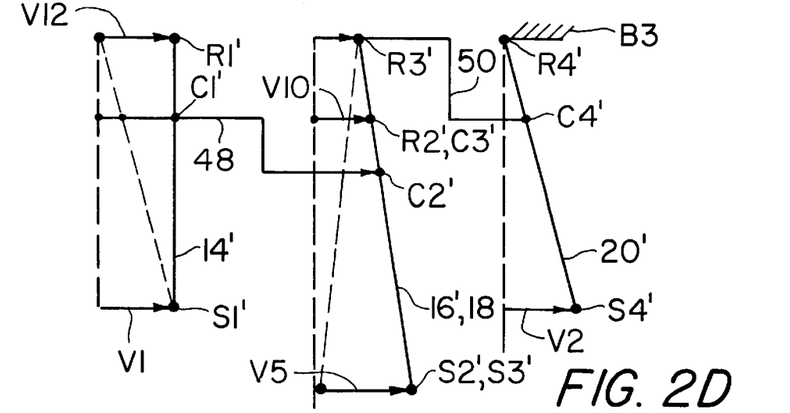

To then shift from second range into third range, brake B2 is disengaged as brake B3 is engaged (see table of FIG. 3). From FIG. 1A, it is seen that engagement of brake B3 grounds ring gear R4 (point R4') of planetary gear set 20. FIG. 2D represents the actions of the planetary gear elements in third range. The phantom line positions of levers 14', 16',18', and 20' in FIG. 2D represent their Lever Analogy positions at the upper end of the second range (see FIG. 2C). It will be noted that the orientation of lever 20' at the second-third range shift point is fixed (assuming constant engine speed) during third range operation by the engagement of brake B3 and the mechanical input (vector V2) on sun gear S4. This establishes, via carrier point C4', ring gear point R3' as a pivot point for lever 16',18', which swings in a counterclockwise direction from its phantom line position toward its solid line position, as the hydrostatic input speed (vector V5) on sun gears S2, S3 is increased by upstroking HSU 4. At the same time, the engine-ratioed speed on sun gear S1, represented by vector V1, establishes a pivot point S1' about which lever 14' may pivot (since brake B1 is disengaged) to accommodate the increasing speed of the interconnected carriers C1 and C2 (point C1',C2') as the hydrostatic power unit is upstroked through third range.

Thus, planetary gear levers 14' and 16,18' swing about their respective pivot points from their respective phantom line positions at the lower end of third range to their solid line positions at the upper end of third range (FIG. 2D) as hydrostatic power unit stroke is increased. It is seen that vector V10 has increased in length, representing the higher output shaft forward speed of carrier C3 (point R2,C3') at the upper end of third range. Vector V12 represents the forward speed of ring gear R1 at the upper end of third range.

Figure 2E:
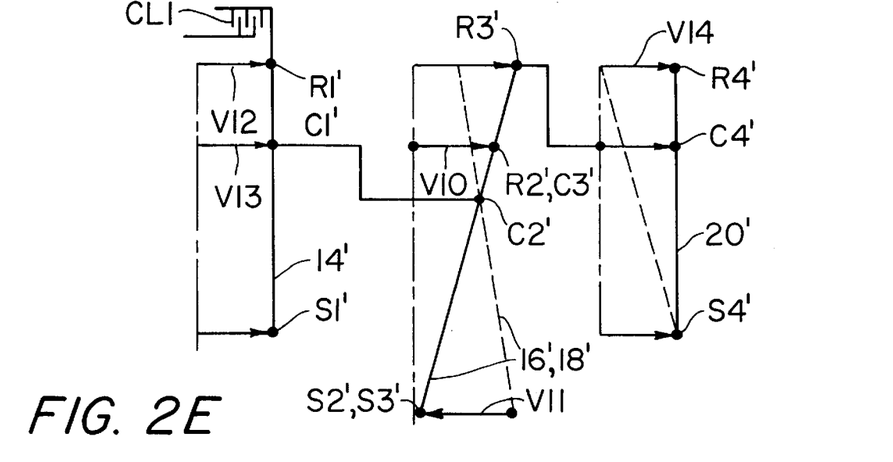

As seen in FIG. 3, shifting from third to fourth range involves disengaging brake B3 and engaging clutch CL1. Ring gear R1 of planetary gear set 14 is now driven by the mechanical input of countershaft 26 at engine speed ratioed by the spur gear sets 24–25 and 28–29 (vector V12). Moreover, since sun gear S1 continues to be driven off countershaft 26 (vector V1), the orientation of lever 14', seen in FIG. 2E, is fixed by these mechanical inputs, and carrier C1 is driven at a forward speed, represented by vector V13, as is the interconnected carrier C2 of planetary gear set 16. Carrier point C2' can thus again serve as a pivot point for lever 16',18'.

It is then seen from FIG. 2E that, as hydrostatic input speed (vector V11) is decreased by downstroking hydrostatic power unit 4, lever 16',18' is pivoted from its phantom line position toward its solid line position, and the forward speed of ring gear R2 and planetary gear carrier C3 increases (vector V10) as does the forward speed of output shaft 10 during acceleration through fourth range. Lever 20' simply swings about pivot point S4' by virtue of the interconnection between ring gear point R3' and carrier point C4'.

The table in FIG. 3 illustrates that, to shift from fourth range to fifth range, clutch CL1 is disengaged as clutch CL2 is engaged. As seen in FIG. 1A, ring gear R4 of planetary gear set 20 is now driven by the mechanical input on countershaft 26 at engine speed ratioed by spur gear sets 24–25 and 30–33.

Figure 2F:
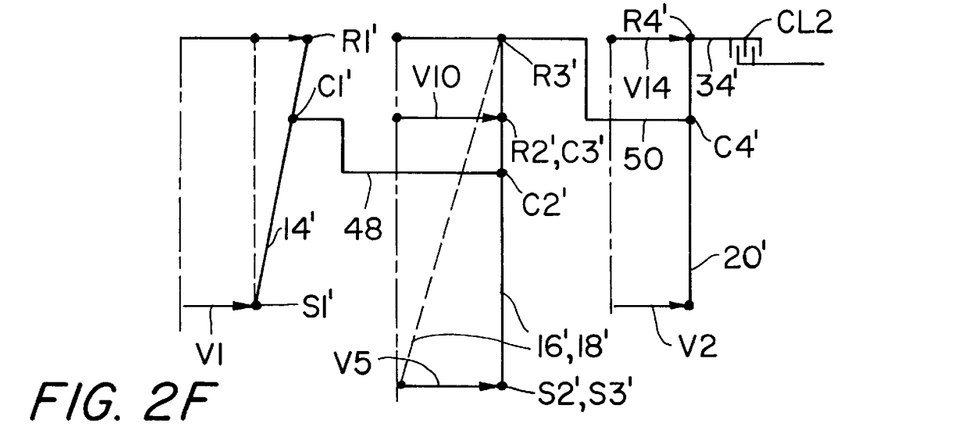

FIG. 2F graphically depicts the actions of the planetary gear elements in fifth range. As in previous graphic representations, the phantom lines illustrate the orientations of levers 14', 16', 18' and 20' at the shift point between fourth and fifth ranges. With both sun gear S4 and ring gear R4 now being driven off the countershaft 26 at the forward speeds represented by vectors V2 and V14, point C4' effectively establishes ring gear point R3' as a pivot point about which lever 16',18' is swung in the counterclockwise direction as the transmission is accelerated through fifth range by now upstroking (vector V5) the hydrostatic power unit. This increases the speed of sun gears S2, S3 in infinitely variable fashion, and the forward speed of carrier C3 (point R2',C3') increases proportionately (vector V10), as does transmission output speed on shaft 10. Since sun gear S1 of planetary set continues to be driven at the forward speed represented by vector V1, point S1' serves as a pivot for lever 14'. Since ring gear R1 is free to spin, lever 14 is free to swing from its dotted line position to its solid line position.

Figure 2G:
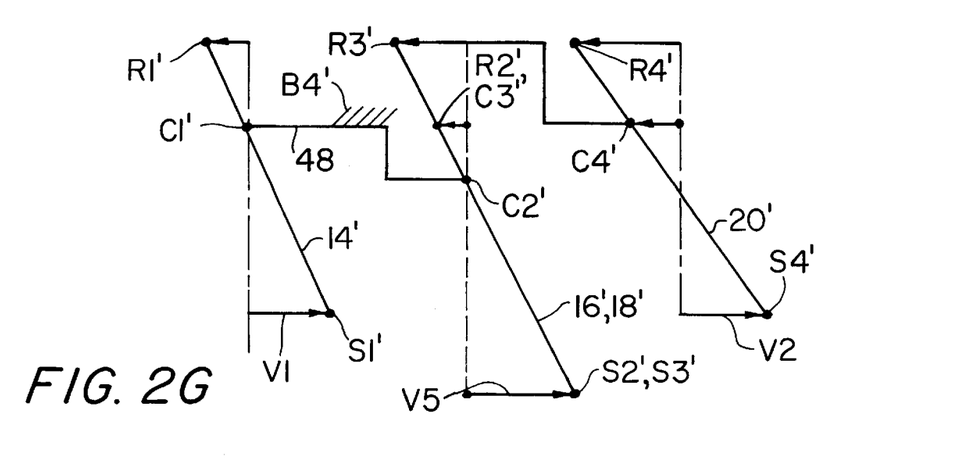

FIG. 2G graphically illustrates operation of the transmission in a reverse range. As illustrated in FIG. 3, shifting into reverse range from a first range neutral condition, imposed by setting a 0% stroke in hydrostatic power unit 4, is achieved by disengaging brake B1 and engaging brake B4. As seen in FIG. 1A, brake B3 grounds carriers C1 and C2 of planetary gear sets 14 and 16. As seen from FIGS. 2G and 2A, the orientation of lever 14' is the same for both first range neutral and reverse range, and the phantom line orientation of lever 16',18' in FIG. 2G, corresponds to its orientation in FIG. 2A at first range neutral. Since both carriers C1 and C2 are grounded by brake B4, carrier C2 provides a pivot point C2' (rather than pivot point R3' in first forward range) about which lever 16',18' pivots from its phantom line to its solid line position as HSU 4 is upstroked through reverse range. Since this lever motion is in the counterclockwise direction, it is seen that speed vector V15 of carrier C3 is now in the left (reverse) direction, which is opposite to the forward vector directions indicated in FIGS. 2B–2F for forward range operations. Thus, output shaft 10 is driven in the reverse direction at infinitely variable speed ratios determined by the stroke setting of HSU unit 4. Lever 20' pivots counterclockwise about sun gear point S4', drawn by the interconnection of carrier point C4' with ring gear point R3'.

In accordance with a feature of the present invention, by appropriate selection of the gear ratios of planetary gear sets 14, 16, 18, and 20, and the spur gear ratios included in the various power flow paths between engine and the planetary gear sets, synchronous shifting of the transmission between its multiple ranges can be advantageously achieved. This synchronous shifting can be appreciated by again referring to FIGS. 2B–2G.

As seen in FIG. 2B, as transmission 2 is accelerated through first range, the reverse speed (vector V9) of ring gear R1 decreases. By proper gear ratio design and an appropriate stroke of HSU 4 that yields a desired first range output speed on shaft 10 may be established when ring gear R1 stops rotating. If, at this operation point, brake B1 is disengaged while brake B2 is engaged, the transmission may be smoothly shifted from first range into second range without disruption of engine speed or transmission output. Thus, the first range to second range shift is synchronous.

An exemplary maximum stroke at this first-second range shift point may be 52%, as indicated in FIG. 3. Such a "short shift" (significantly less than 100% stroke), while the off-road vehicle is below its traction limit and before full engine power is applied, prevents wheel spin. This deep ratio in first range 0.12 at the first-second range shift point means that the HSU does not have to accommodate full engine power and can be downsized accordingly to achieve cost savings. Such HSU downsizing is also accommodated by the fact that the second through fifth forward ranges are hydromechanical ranges, wherein the output load burden is shared by the hydrostatic drive unit HSU and the mechanical drive unit 8.

Now comparing FIGS. 2C and 2D, a synchronous shift point between second and third ranges occurs when the forward speed of ring gear R4, represented by vector V6 in FIG. 2C, decreases to zero at the moment brake B3 is engaged to shift into third range. Here again, the different ratios of the spur gear sets may be readily selected, such that the forward speed of ring gear R4 goes to zero at a desired minimum HSU stroke, e.g., 7.4%, to provide a synchronous shift point into third range.

Now, by comparing FIGS. 2D and 2E, a synchronous shift from third range to fourth range can be achieved by selecting the ratio of spur gear set 28–29, such that the forward speed of ring gear R1 (vector V12) at a desired maximum stroke, e.g., 101.4% stroke equals the forward speed of the mechanical input existing on sleeve shaft 36. Clutch CL1 can then engage as brake B3 is disengaged to achieve a synchronous shift from third to fourth range.

Synchronous shift from fourth range, illustrated in FIG. 2E, to fifth range, illustrated in FIG. 2F, is achieved by selecting the ratio of spur gear set 30–33 such that the forward speed of this mechanical input from countershaft 26 is matched by the forward speed of ring gear R4 (vector V14) at an appropriate minimum stroke setting, e.g. 11% (FIG. 3), of the hydrostatic power unit at the upper end of fourth range. Then clutch CL2 is engaged, while clutch CL1 is disengaged, to synchronously shift from fourth range into fifth range. Accelerating through fifth range is achieved by upstroking power transmission unit 4 to a maximum transmission output speed at 100% stroke (1:1 ratio).

It can also be seen, from a comparison of FIGS. 2A and 2G, that carrier Cl is stationary when brake B4 is engaged as brake B1 is disengaged to permit a synchronous shift from first range neutral to the reverse range. Acceleration through the reverse range by upstroking HSU 4 is indicated by vector V5. Similarly, ring gear R3 is stationary at the lower end the reverse range at 0% hydrostatic power unit stroke, and thus brake B1 can be engaged as brake B4 is disengaged to synchronously shift back into first range neutral from reverse range.

The table of FIG. 3, referred to above, identifies which one of the brakes and clutches is engaged in each of the five forward transmission ranges and the single reverse range. Also indicated in this table are representative stroke ranges of the hydrostatic power (HSP) unit 4 to accelerate through each of the ranges, the direction of stroke, and the stroke setting at the range shift points. This table also indicates representative ranges of speed ratios of engine speed (Vin) on input shaft 22 and transmission output speed (Vout) on shaft 10 in each range. Note that HSU 4 goes into overdrive at the upper end of third range (101.4% stroke).

While the forgoing description deals with the progressive increase in output speed from neutral to the multiple forward speed ranges to a maximum transmission output speed, decreasing output speed from maximum to neutral would be accommodated in a reverse manner. That is, rather than upstroking the hydrostatic transmission unit to accelerate through the odd numbered forward ranges and downstroking during the even numbered forward ranges to accelerate from neutral to maximum speed, the hydrostatic transmission would be downstroked during the odd numbered ranges and upstroked during the even numbered ranges to decelerate from maximum speed to neutral. Synchronous shift from range to range during deceleration would be accomplished in the manner described above for acceleration through the ranges. It would be understood by those skilled in the transmission art upon consideration of the foregoing description, that, for example, a downshift from fifth range to third range and the transmission embodiment of FIG. 1a, as may be necessary during a hard braking operation, can be easily accomplished by releasing clutch CL2 and applying brake B3 simultaneously with an appropriate change in stroke of the hydrostatic transmission unit.

The foregoing description has focussed on speed ratio aspects of transmission 2 in terms of achieving infinitely variable output speed in all ranges and acceleration through the forward speed ranges from first range neutral to maximum speed at the top end of fifth range. Another equally important aspect of transmission 2 is torque ratio. As is well understood by those skilled in the art, for any given transmission operating point, input power of the engine will equal the output load imposed on the transmission. Engine output power is a function of the product of engine speed and engine torque imposed on the transmission input shaft. Output load is a function of the product of transmission output speed and load torque imposed on the transmission output shaft. By its function, a transmission will alter the values of speed and torque over its multiple ranges. Yet power, the product of speed and torque, is always balanced. As described in the above-cited Benford et al. article, the Lever Analogy technique can also be utilized to determine power balance on each of the planetary gear sets 14,16 and 18 in transmission 2 of FIG. 1. Since one skilled in the art will understand from a study of the Benford et al. paper how to conduct a Lever Analogy analysis for power balance with respect to a multi-range hydromechanical transmission structured in accordance with the present invention, such an analysis here will not be undertaken here for the sake of brevity.

However, several observations with regard to power flow in the hydrostatic power unit 4 and the mechanical power unit 8, should be noted. From the foregoing description, it will be appreciated that, in the first forward and reverse ranges, the direction of power flow is forward through hydrostatic power unit 4 and planetary gear sets 16,18 to output shaft 10. However, at the first-second range shift point, power flow is altered by the involvement of mechanical power unit 8. Because this shift is synchronous, the speeds of all planetary gear elements remain unchanged until the hydrostatic transmission unit 4 is stroked downwardly to begin the introduction of mechanical power flow through mechanical power unit 8. Since the hydrostatic power unit is being stroked downwardly to accelerate through second range, power flow through the hydrostatic power unit is reversed. This power flow reversal in the hydrostatic transmission unit also occurs in fourth range. Consequently, an important consideration in selecting the planetary gear ratios is to maintain a nearly constant torque on the hydrostatic transmission unit during these power flow reversal. To do so is to minimize hydraulic pressure changes in the hydrostatic transmission unit that would alter efficiency and require a stroke offset to adjust to an abrupt change in power magnitude. In practice, some stroke offset may be needed to increase hydrostatic pressure so as to compensate for mechanical losses. It will appreciated that the better the "power match" at the range shift points, the smoother the power flow through the transmission. Power match considerations are most important at the lower range shift points (first range to second range) when hydrostatic pressure in hydrostatic power unit 4 is highest.

Since power flow in second and fourth range is reversed, and thus flows from output to input of the hydrostatic transmission unit, rather than from input to output in the first, third, and fifth ranges, such reversal of power flow is effectively regenerative power flow, which must also be considered in order to achieve synchronous shifting. As noted above, any abrupt change in torque will cause a correspondingly abrupt change in hydrostatic pressure in the hydrostatic power unit. Although hydraulic fluid is effectively incompressible, such sudden pressure changes will alter the efficiency of the hydrostatic transmission unit, typically as a result of excessive fluid leakage. Consequently, a shift offset adjustment of hydrostatic stroke may be required concurrently with each range shift to counterbalance abrupt torque changes. Appropriate shift offsets usually differ at each shift point and are also affected by load. Shift offsets may also be used to compensate for changes in mechanical power unit efficiency in various ranges. In practice, shift offsets are usually less than 5% stroke, and thus it is desirable to leave some stroke margin at the shift points to allow for the implementation of any shift offsets.

Figure 4:
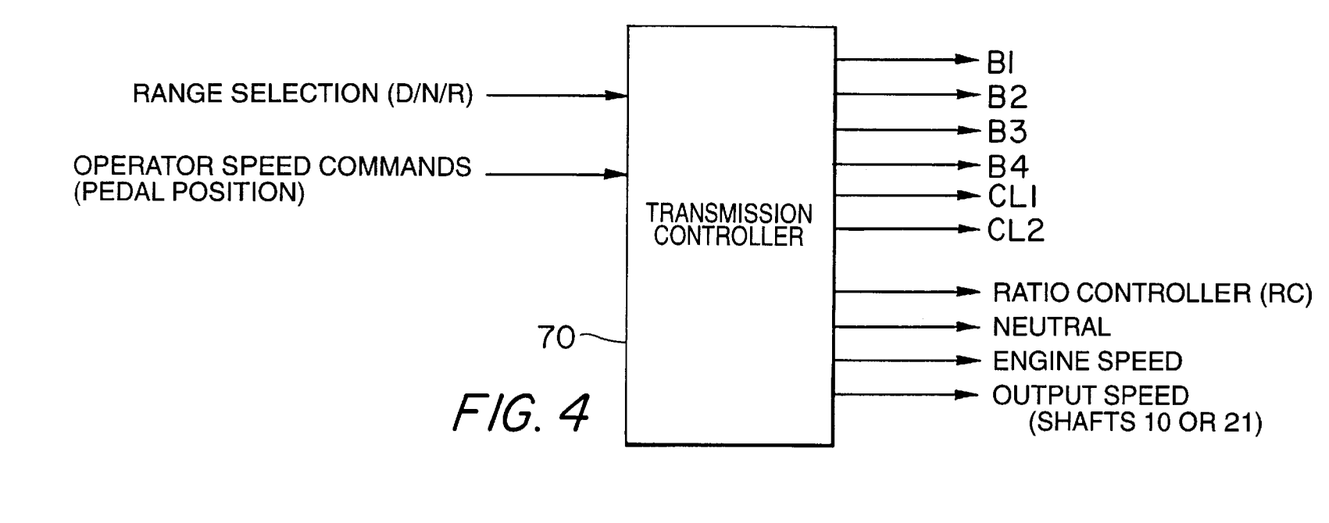
FIG. 4 is a block diagram of a transmission controller that may be utilized to operate the transmission embodiment of FIG. 1A through its multiple transmission ranges.

Operation of hydromechanical transmission 2 of FIG. 1 in its various ranges and synchronous shifting between ranges may be automatically controlled by a transmission controller 70, illustrated in FIG. 4. Traditionally, agricultural tractor transmissions have been manual transmissions requiring hand shifting between as many as twenty-four ranges. Transmission controller 70 receives operator speed input commands in terms of accelerator pedal position signals and range selection signals in terms of the position of a shift selection lever being in either of drive (D), neutral (N), or reverse (R) positions. The transmission controller 70 also receives engine speed sensor signals indicating the RPMs of transmission input shaft 22 and output speed sensor signals indicating the RPMs of transmission output shaft 10. In response to these input signals, transmission controller 70 outputs signals to actuate selected ones of the brakes B1–B4 and clutches CL1–CL2. The transmission controller also outputs ratio control signals to a ratio controller, illustrated schematically in FIG. 5 at RC, for controlling the stroking of hydrostatic power unit 4. Such ratio control signals may be in the form of pulse width modulated (PWM) signals, such as disclosed in applicant's copending applications, Ser. Nos. 08/380,269 and 08/423,069. As also illustrated in FIG. 4, transmission controller 70 outputs a signal for establishing a "true neutral" condition in hydromechanical transmission 2. This signal may be used by ratio controller RC in FIG. 5, if this ratio controller and hydrostatic power unit 4 are equipped with the decompression feature disclosed in the above-cited U.S. patent application Ser. No. 08/543,545. Alternatively, this neutral signal may be applied to disengage an input clutch (not shown) included in the drive train between engine 6 and transmission input shaft 22.

While transmission controller 70 may be implemented with analog or fluidic circuitry, digital implementation is preferred. Thus, all of the input signals to the transmission controller 70 are digitized by analog-to-digital converters and then processed by a microprocessor.

Two major functions of transmission controller 70 are to engage the clutches and brakes at the proper times to achieve synchronous range shifting and to effectively match engine power to output load by stroke control of hydrostatic power unit 4. Matching engine power to output power requires a predetermination of engine output power and fuel efficiency at various engine speeds. Having done this, it is possible to determine the optimum engine power/fuel economy operating point at every pedal position (speed command). This relationship, termed "schedule curve", may be stored as an algorithm in a memory associated with the transmission controller microprocessor.

During vehicle operation, the microprocessor continuously compares the operator speed commands to engine speed and adjusts the transmission ratio (hydrostatic power unit stroke) to match the schedule curve. Should the vehicle encounter a grade, output load increases and engine speed decreases. However, if the operator maintains pedal position (constant speed command), transmission controller 70 strokes the hydrostatic power unit to reduce transmission ratio until the schedule curve is again matched. At this point, engine speed and power have recovered, but vehicle speed has decreased. If the operator repositions the accelerator pedal to maintain vehicle speed on the grade, engine speed is increased to match the higher output load. Every engine has a unique, optimum schedule curve that can readily be programmed into the transmission controller microprocessor to adapt transmission 2 to any particular vehicle engine.

Figure 5:
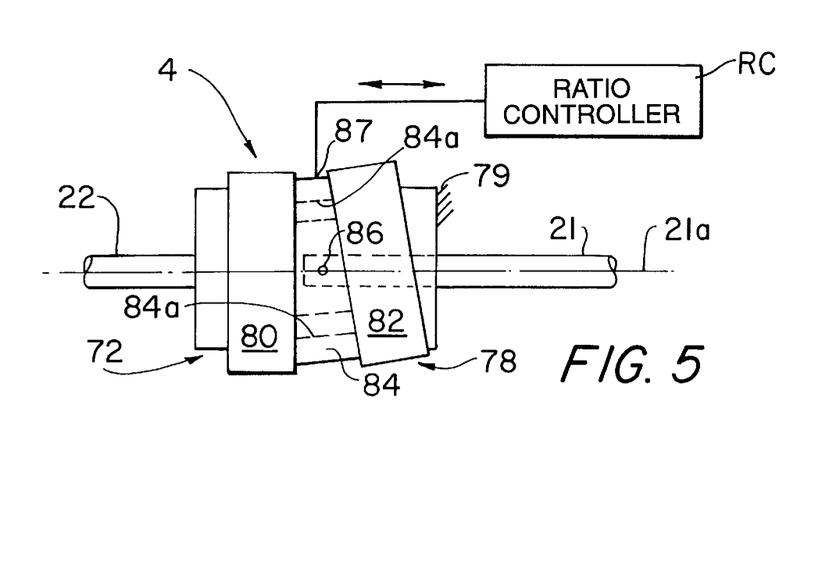
FIG. 5 is a generalized side view of a hydrostatic power unit that may be utilized in the transmission embodiment of FIG. 1A.

While a variety of hydrostatic power units may be implemented in the hydromechanical transmission of the present invention, the unique capabilities of a hydrostatic power unit of the type disclosed in Folsom, U.S. Pat. No. 5,423,183 render it particularly suitable for application in the present invention. The complete disclosure of this patent is expressly incorporated by reference herein, and a generalization of this disclosure is illustrated in FIG. 5. As seen in this figure, hydrostatic power unit 4 includes a hydraulic pump unit, generally indicated as 72, driven by an input shaft 74 that may correspond to transmission input shaft 22 in FIG. 1. An output shaft 76, which may correspond to output shaft 21 in FIG. 1, extends through a central opening in a hydraulic motor unit, generally indicated at 78, that is grounded to a unit housing, as indicated at 79. A cylinder block 80 of the driven pump unit 72 and a cylinder block 82 of the grounded motor unit 78 are respectively pivotally mounted so as to assume interfacial contacts with a wedge-shaped swashplate 84 that is torque-coupled to output shaft 76 by a pivotal connection, indicated at 86. As input shaft 74 is driven by engine 6 in FIG. 1, pumped exchanges of pressurized hydraulic fluid between the hydraulic pump 72 and motor 78 units through swashplate ports 84a produce a resultant torque on the swashplate 84 that is coupled to the output shaft 76 by coupling 86 as output hydrostatic torque. To change the ratio of input speed on shaft 74 to output speed on shaft 76, ratio controller RC is connected, as indicated at 87, to pivot swashplate 84 about an axis of coupling 86 that intersects the axis 76a of output shaft 76. This angular adjustment of swashplate orientation (angle) strokes hydrostatic power unit 4 to produce a unidirectional, infinitely variable speed hydrostatic output on shaft 76 at ratios ranging from 1:0 (0% stroke) or neutral to at least 1:1 (100% stroke).

The hydrostatic power unit of the type disclosed in U.S. Pat. No. 5,423,183 has a torque multiplying capability of approximately 5:1 at low speed ratios (low stroke settings), which is more than ample torque to accelerate a vehicle from a standing start in the hydrostatic first forward and reverse ranges of transmission 2. Other unique and beneficial characteristics of this type of hydrostatic power unit that lend to application in the hydromechanical transmission of the present invention are set forth in the cited Folsom patent.

It is seen from the foregoing description that the present invention provides a continuously variable, multi-range, synchronous shift transmission capable of propelling a motor vehicle in a most efficient manner by changing transmission ratio to precisely match engine power to output load. In fact, engine power may be held at the engine's point of peak operating efficiency as the vehicle is accelerated from rest to maximum speed. Further, the transmission embodiments of the invention offer a smooth, stepless, power flow across the entire operating range without cycling and shock loading to the vehicle drive system. Thus, the present invention affords the capability to precisely match engine power to varying output loads to achieve optimum fuel economy as well as acceleration and overall vehicle performance.

It will be apparent to those skilled in the art that great modifications and great variations could be made in the multi-range hydromechanical transmission of the present invention and in the constructions of the invention embodiments as set forth above without departing from the scope or the spirit of the invention.

Other embodiments of the invention will be apparent to those skilled in the art from consideration of the specification and practice of the invention disclosed herein. It is intended that the specification and examples be considered as exemplary only, but the true scope and spirit of the invention being indicated by the following claim.

What is claimed is:

1. A vehicular multi-range hydromechanical transmission comprising, in combination:
   a transmission controller for receiving operator speed commands;
   a hydrostatic power unit having a first mechanical input for driving connection to a prime mover and a unidirectional hydrostatic output, the hydrostatic power unit operatively connected for control by the transmission controller to provide an infinitely variable transmission ratio between a speed of the first mechanical input and a speed of the hydrostatic output over a continuous range of at least 1:0 to 1:1; and
   a mechanical power unit having a second mechanical input for driving connection to the prime mover and a transmission output for connection to a driving wheel of a vehicle, the mechanical power unit including:
   a first planetary gear set having a first gear element connected to the second mechanical input at a first gear ratio, and second and third gear elements;
   a second planetary gear set having a fourth gear element connected to the second mechanical input at a second gear ratio, and fifth and sixth gear elements;
   a combining gear mechanism including third and fourth interconnected planetary gear sets having a seventh gear element connected to the third gear element of the first planetary gear set, an eighth gear element connected to the hydrostatic output, a ninth gear element connected to the sixth gear element of the second planetary gear set, and a tenth gear element connected as the transmission output; and
   range shifting means actuated by the transmission controller in response to the operator input speed command for one of braking or clutching selected gear elements of the first through fourth planetary gear sets to produce an infinitely variable output speed at the transmission output within each of at least one reverse range and at least first, second, and third forward ranges.

2. The transmission defined in claim 1, wherein the range-shifting means includes a first brake actuated by the transmission controller to ground the ninth gear element of the combining gear mechanism and the sixth gear element of the second planetary gear set, thereby to establish a transmission neutral condition at the transmission output while the transmission ratio of the hydrostatic power unit, set by the transmission controller, is 1:0, and to produce infinitely variable output speed on the transmission output in the first forward range in direct relation to the infinitely variable speed of the hydrostatic output at transmission ratios other than 1:0.

3. The transmission defined as defined in claim 2, wherein the range-shifting means further includes a second brake actuated by the controller to ground the third gear element of the first planetary gear set and the seventh gear element of the combining gear mechanism, and thereby produce infinitely variable output speed at the transmission output in the reverse range in direct relation to the infinitely variable speed of the hydrostatic output at transmission ratios other than 1:0.

4. The transmission defined in claim 3, wherein the range-shifting means further includes a third brake actuated by the controller to ground the second gear element of the first planetary gear set and thereby produce infinitely variable output speed at the transmission output in the second forward range in reverse relation to the infinitely variable speed of the hydrostatic output.

5. The transmission defined in claim 4, wherein the range-shifting means further includes a fourth brake actuated by the controller to ground the fifth gear element of the second planetary gear set and thereby produce infinitely variable output speed at the transmission output in the third forward range in direct relation to the infinitely variable speed of the hydrostatic output.

6. The transmission defined in claim 5, wherein the first and second gear ratios and gear ratios of the first to fourth planetary gear sets have coordinated values to enable the controller to engage and disengage the first to third brakes in timed relation to input speed of the prime mover and transmission ratio of the hydrostatic power unit, such as to achieve synchronous shifting between the first and second forward ranges and between the second and third forward ranges.

7. The transmission defined in claim 5, wherein the first gear element is a first sun gear, the second gear element is a first ring gear, the third gear element is a first planet gear carrier, the fourth gear element is a second sun gear, the fifth gear element is a second ring gear, the sixth gear element is a second planet gear carrier.

8. The transmission defined in claim 7, wherein the seventh gear element is a third planet gear carrier included in the third planetary gear set, the eighth gear element comprises interconnected third and fourth interconnected sun gears of the third and fourth planetary gear sets, respectively, the ninth gear element is a fourth ring gear of the fourth planetary gear set, and the tenth gear element comprises a fourth ring gear of the third planetary gear set and a fourth planet gear carrier of the fourth planetary gear set.

9. The transmission defined in claim 5, wherein the range-shifting means further includes a first clutch actuated by the controller to connect the second gear element to the second mechanical input at the first gear ratio and thereby produce an infinitely variable output speed at the transmission output in a fourth forward transmission range in inverse relation to the infinitely variable speed of the hydrostatic input.

10. The transmission defined in claim 9, wherein the range shifting means further includes a second clutch actuated by the controller to connect the fifth gear element to the second mechanical input at the second gear ratio and thereby produce infinitely variable output speed at the transmission output in a fifth forward transmission range in direct relation to the infinitely variable speed of the hydrostatic output.

11. The transmission defined in claim 10, wherein the first and second gear ratios and gear ratios of the first to fourth planetary gear sets have coordinated values to enable the controller to actuate the first to fourth brakes and the first to second clutches in timed relation to input speed of the prime mover and the transmission ratio of the hydrostatic power unit, such as to achieve synchronous range shifting during acceleration through the first to fifth forward ranges.

12. The transmission defined in claim 5, wherein the hydrostatic power unit includes:

an input shaft for driving connection to the first mechanical input;

an output shaft having an axis and on which the hydrostatic output is produced;

a hydraulic pump unit driven by the input shaft;

a stationary hydraulic motor unit;

a wedge-shaped swashplate operatively positioned to accommodate pumped exchanges of hydraulic fluid between the hydraulic pump and motor units through ports in the swashplate, the swashplate connected in torque-coupled relation with the output shaft and adjustable about a pivot axis, intersecting the output shaft in orthogonal relation, through a continuous range of swashplate angles; and a ratio controller operable by the transmission controller to pivot the swashplate through the range of swashplate angles and thereby stroke the hydrostatic power unit through the 1:0 to 1:1 transmission ratio range.

13. The transmission defined in claim 6, wherein the controller disengages the first brake and engages the third brake to synchronously shift from first forward range to second forward range at a transmission ratio of the hydrostatic power unit that produces a power output below the traction limit of the vehicle.

* * * * *